(12) United States Patent
Canins

(10) Patent No.: US 11,310,893 B2
(45) Date of Patent: Apr. 19, 2022

(54) EVENT LAMP THAT CAN BE OPERATED AS A BATTERY-POWERED SPOTLIGHT AND PERMANENTLY WIRED SPOTLIGHT

(71) Applicant: ASTERA LED TECHNOLOGY GMBH, Munich (DE)

(72) Inventor: Simon Canins, Munich (DE)

(73) Assignee: ASTERA LED TECHNOLOGY GMBH, Munich (DE)

( * ) Notice: Subject to any disclaimer, the term of this patent is extended or adjusted under 35 U.S.C. 154(b) by 0 days.

(21) Appl. No.: 17/257,760

(22) PCT Filed: Jul. 3, 2019

(86) PCT No.: PCT/DE2019/100622
§ 371 (c)(1),
(2) Date: Jan. 4, 2021

(87) PCT Pub. No.: WO2020/007416
PCT Pub. Date: Jan. 9, 2020

(65) Prior Publication Data
US 2021/0160992 A1 May 27, 2021

(30) Foreign Application Priority Data
Jul. 6, 2018 (DE) .................. 10 2018 116 433.5

(51) Int. Cl.
*H05B 47/17* (2020.01)
*H05B 47/175* (2020.01)
(Continued)

(52) U.S. Cl.
CPC .............. *H05B 47/17* (2020.01); *F21L 4/08* (2013.01); *F21L 14/00* (2013.01); *H05B 47/175* (2020.01); *F21W 2131/406* (2013.01); *H04B 1/38* (2013.01)

(58) Field of Classification Search
CPC ......... H05B 47/17; H05B 47/175; F21L 4/08; F21L 14/00; H04B 1/38; F21W 2131/406
See application file for complete search history.

(56) References Cited

U.S. PATENT DOCUMENTS

| 2003/0067767 A1* | 4/2003 | Liu | H05B 39/041 |
| | | | 362/183 |
| 2012/0104858 A1* | 5/2012 | Noe | H05B 47/20 |
| | | | 307/66 |

(Continued)

FOREIGN PATENT DOCUMENTS

| CN | 107062133 A | 8/2017 |
| DE | 202012012637 U1 | 7/2013 |

(Continued)

OTHER PUBLICATIONS

Weikai et al., Google English Translation of CN 107062133 A "Wirelessly controlled movable stage lamp performing system", Aug. 18, 2017, 11 pages. (Year: 2017).*

(Continued)

*Primary Examiner* — Daniel D Chang
(74) *Attorney, Agent, or Firm* — Hauptman Ham, LLP

(57) ABSTRACT

The invention relates to an electrical mobile event lamp. The object of the invention is to design a mobile electrical event lamp for hiring for events, such that same can be used alternatively for permanently wired and battery-powered operation. According to the invention, this is achieved by integrated rechargeable batteries for power supply and a connection for a wiring of the lamp provided for an alternative power supply, as well as a blocking function implemented in the electronic controller of the lamp for access to the integrated battery implemented in the electronic controller of the lamp, and a data connection for activating or deactivating the blocking function by means of an external data synchronization.

9 Claims, 1 Drawing Sheet

(51) Int. Cl.
*F21L 4/08* (2006.01)
*F21L 14/00* (2006.01)
*F21W 131/406* (2006.01)
*H04B 1/38* (2015.01)

(56) References Cited

U.S. PATENT DOCUMENTS

| | | | |
|---|---|---|---|
| 2014/0091727 A1* | 4/2014 | Westermarck | H05B 45/00 |
| | | | 315/210 |
| 2018/0188018 A1* | 7/2018 | Brown | H05B 45/357 |
| 2019/0261493 A1* | 8/2019 | Dolan | H05B 45/10 |

FOREIGN PATENT DOCUMENTS

| | | |
|---|---|---|
| EP | 3145046 A2 | 3/2017 |
| GB | 2526801 A | 12/2015 |
| WO | 2009064305 A2 | 5/2009 |

OTHER PUBLICATIONS

Weikai et al., worldwide.espacenet.com English Translation of CN 107062133 A "Wirelessly controlled movable stage lamp performing system", Aug. 18, 2017, 9 pages. (Year: 2017).*

International Search Report from corresponding International Application No. PCT/DE2019/100622, dated Oct. 28, 2019, pp. 1-5, European Patent Office, Rijswijk, Netherlands.

* cited by examiner

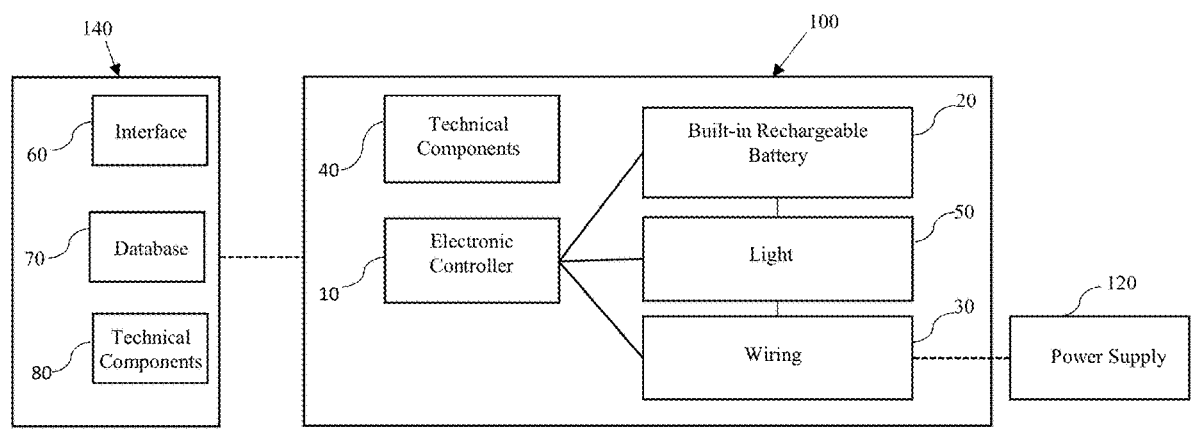

EVENT LAMP THAT CAN BE OPERATED AS A BATTERY-POWERED SPOTLIGHT AND PERMANENTLY WIRED SPOTLIGHT

RELATED APPLICATIONS

The present application is a National Phase of International Application Number PCT/DE2019/100622, filed Jul. 3, 2019, and claims the priority of German Application Number 10 2018 116 433.5, filed Jul. 6, 2018.

TECHNICAL FIELD

The invention relates to an event lamp that can be operated as a battery-powered spotlight and a permanently wired spotlight.

SUMMARY

The subject matter of the invention is spotlights designed primarily for the events sector, for which reason the terms spotlight and event lamp are used synonymously hereinafter. Said spotlights and event lamps are generally set up for an event, e.g. a trade fair presentation lasting a number of days, and are taken down again after the event has ended. They are accordingly spotlights that are not provided for a permanent installation, as is the case e.g. for permanently installed lighting systems in theaters or studios.

Such spotlights that can be used in a mobile fashion can be used in an expedient manner both in rechargeable battery mode and in a permanently wired fashion. In general, for present event lamps it is still the case that the question of whether they are used in a wired or battery-powered fashion also depends on the performance requirements of the event at which the spotlights are required. Spotlights containing a rechargeable battery are normally less bright and in respect of this point cannot replace permanently wired spotlights, or they lack essential functions that are implemented only by wired spotlights. However, it can be assumed that this will change in the future since the segment of battery-powered spotlights is growing, in technical terms approaching permanently wired spotlights in respect of performance and thus becoming more professional overall.

Such spotlights or event lamps are designed for the professional leasing market, where sound and lighting products are leased for daily rates. It is customary in this market for battery-powered spotlights generally to be leased for significantly higher daily rates than comparable spotlights without a rechargeable battery, since they enable a faster set-up and thereby help to save personnel costs.

The subject matter of the invention is, then, a spotlight or an event lamp which is intended to be leased both in a manner such that it is operated with a rechargeable battery and for uses for which it is permanently wired. By way of example, the permanently wired use is expedient and economic if said spotlight or event lamp is used for a relatively long leasing duration, e.g. an entire week, and ought not to be charged during this time. In these cases, accordingly, the daily rate of a permanently wired lamp is also fixed for the leasing, rather than the daily rate of a battery-powered spotlight.

Against this background, the object of the present invention is to design a mobile electrical event lamp for leasing for events such that it can be used alternatively for permanently wired and battery-powered operation. In this case, the form of use for each event lamp is intended to be switchable between these two operating states in a restrictable manner in line with the leasing terms.

This object is achieved according to the invention by means of an event lamp and a method for the activation and deactivation of the access by the mobile electrical event lamp to an integrated rechargeable battery for voltage supply.

The problem arises, then, from the fact that it is necessary to ensure that the lessee of the event lamp uses the latter only within the scope agreed in the leasing contract. In order that the lessee does not actually use the event lamp in battery-powered operation later, the rechargeable battery function should thus be embodied such that it can be switched off.

In the specific application situation, however, it may easily happen that the lessee of the event lamp spontaneously does indeed require the rechargeable battery function, since for example the lighting concept needs to be adapted on site or the intended wiring is simply not able to be realized to the extent planned. This means that the spotlight as event lamp should also enable the fundamental use in battery-powered operation on site after delivery and, accordingly, after adaptation of the leasing terms between lessee and lessor, should also be able to be released for battery-powered operation remotely by the lessor.

BRIEF DESCRIPTION OF THE DRAWING

FIG. 1 is a schematic configuration diagram showing an electrical mobile event lamp 100 according to an embodiment of the present invention.

DETAILED DESCRIPTION

According to FIG. 1, an electrical mobile event lamp 100 includes an electronic controller 10, a built-in rechargeable battery 20 for supplying power to the electrical mobile event lamp 100, a writing 30 for connecting the electrical mobile event lamp 100 to an alternative power supply 120, and a light 50 configured to be powered by the built-in rechargeable battery 20 or the power supply 120 via the wiring 30.

The inventive solution provides, then, for a blocking function for battery-powered operation to be implemented in the electronic controller of the event lamps, which for example also controls the driving of the individual spotlights in the overall lighting concept. In this way, by way of said electronic controller upon the delivery of the event lamps for each individual spotlight or else a group of spotlights it is possible to stipulate whether battery-powered operation can be accessed during its/their operation or whether the spotlights are released exclusively for wired operation.

This blocking function implemented in the electronic controller is part of the operating software which is an integral part of the electronic controller for the use of the event lamp and interacts via at least one interface 60 with further controller software which, in one possible design, for example, is installed as specifically designed application software in the form of an app on an external device 140 including a mobile terminal such as a tablet or smartphone.

This possibility of access to the operating software of the event lamp can thus be implemented by the lessor before the spotlights are issued, here also by way of non-mobile devices such as PCs, wherein the lessor thus has the possibility of intervening in the operating software and thus activating or deactivating the blocking function for battery-powered operation. As mentioned in the statement of the object, however, the problem additionally arises as to how the intervention and the activation or deactivation of the blocking function are intended to be achieved even after the delivery of the event lamp to the lessee.

This is intended to be solved according to the invention, then, such that an activation or deactivation of the blocking function in the electronic controller of the event lamp is effected via a data connection of the electrical event lamp to external devices for electronic data processing. There are then various alternative solution possibilities for said data connection and the data exchange.

One possible solution according to the invention provides for the lessee of the event lamp likewise to have, within the scope of the control of the lighting concept, specifically designed application software in the form of an app, for example, which comprises all relevant control parameters released by the lessor for the lessee. However, here a restriction for the performance abilities of the event lamp is deliberately part of the customized application software which the lessee ought not to be able to access himself/ herself, wherein this is intended also to include the question of battery-powered operation or permanently wired operation.

It follows from this that the lessee or customer on site does not have the possibility of using for example the operator control app on his/her smartphone or tablet PC to actively initiate a deactivation of the blocking function by way of this installed application software. Therefore, according to the invention, two options were provided with regard to how the activation or deactivation can nevertheless be effected despite this restriction of the application software available to the lessee.

The first solution here provides for implementing the activation and deactivation of the blocking function for access to the rechargeable battery by means of code input in the controller software integrated in the electrical lamp. By way of the application software which for example is installed on the smartphone or tablet PC and exchanges data with the controller software of the electrical lamp via the data connection, the lessee or else the lessor can release or block the corresponding operating state by inputting the activation or deactivation code.

What is achieved by this solution is that not only is it possible for the lessor himself/herself to effect this code input before the electrical lamp is issued to the lessee, but it is also possible, at the installation site of the event lamps, for the lessee to react to necessary changes by changing the operating state and to release blocked battery-powered operation, for example. However, according to the invention, here the lessor remains in control of this measure; the lessor can make the required code available to the lessee only after corresponding adaptation of the leasing terms.

In an alternative solution, even greater control can be achieved by virtue of the activation and deactivation of the blocking function for access to the rechargeable battery not being effected by means of code input, but rather by means of changing the status of a specific electrical event lamp in a database (e.g., 70 in FIG. 1) managed by the lessor. This should be understood to mean that the lessor manages for example his/her entire leased stock of event lamps in a database, which also records, inter alia, whether a specific event lamp has currently been leased by the lessee as a battery-powered lamp or a permanently wired lamp. In the case of an example, the lessee would have leased 5 lamps in more expensive battery-powered operation and 10 lamps in lower-cost wiring operation.

If the lessee then ascertains on site that he/she cannot actually wire up three of the event lamps and hence requires battery-powered operation, this should first be agreed with the lessor, who then changes the status of these three defined event lamps from wiring operation to battery-powered operation in the database for said event lamps. In order then also to transfer this changed status into the electronic controller of the electrical lamp on site, there are then in turn a plurality of alternative solutions.

The first solution is a direct data reconciliation of the electrical event lamp with the lessor's database in which the changed status is stored. That is to say that by accessing this database and reconciling the lamp with this database, the latter can register the new status of battery-powered operation and thus cancel the blocking function existing hitherto. The access to this database becomes possible by means of wired or wireless data transmission between the device for data processing on which the database is stored and the electrical event lamp. Wireless data transmission should be understood to mean standards such as, for example, Bluetooth, WLAN, ZigBee or NFC, with remote data transmissions (RDT) via the telephone network or other transmission media such as air likewise being provided. As shown in FIG. 1, the technical components 40 required for these various methods of data transmission and RDT are accordingly a structural part of any electrical event lamp 100 provided for the data reconciliation.

For this purpose, the access and reconciliation with the database are initiated by the lessor or lessee on the electrical event lamp directly or by means of the application software installed on a smartphone or tablet PC, for example. After access and reconciliation of the lamp-specific parameters stored in the database, the operating state of the event lamp is updated and blocked battery-powered operation is released, for example.

An alternative to this is the solution involving an indirect data reconciliation of the electrical event lamp with the lessor's database in which the changed status is stored. Here provision is made for an access and reconciliation with the database not to be effected directly by way of the relevant electrical event lamp, but rather by way of the application software installed on a smartphone or tablet PC, for example. That is to say that the access to the database need not be additionally effected by the lamp, which therefore also need not have the required technical components for wireless data transmission or remote data transmissions (RDT). The data reconciliation can be effected by way of the already mentioned data connection between the electrical event lamp and an external device for data processing.

This is advantageous in practice since these external devices (e.g., 140 in FIG. 1) for data processing, for example the smartphone or the tablet PC with installed application software, already have technical components (e.g., 80 in FIG. 1) for wireless data transmission (e.g. Bluetooth) and also in particular for remote data transmissions (RDT) (e.g. mobile radio). It is thus readily possible to realize, using a smartphone, access to the database which is kept by the lessor on a stationary device for data processing and is updated.

Moreover, it is possible for the database managed by the lessor on a stationary device for data processing to be made available by way of an online interrogation, such that the interrogation is not effected directly by the lessor on the stationary device for data processing, rather the access is effected online to an internet-based database which can be accessed by way of the lessee's smartphone, for example. In this solution, the event lamp itself does not connect to the internet.

If the lessor would like to lease spotlights without a rechargeable battery function, the lessor can set that prior to the leasing. For this purpose, the event lamps have a serial number, such that the event lamps can be registered individually by the lessor, since the lessor generally would not want to switch off the rechargeable battery function for all of the event lamps. By way of example, an app on a smartphone or tablet PC sends this setting (rechargeable battery function switched off) to the event lamp and registers this setting in an online database, for example. From that time on these event lamps behave as though no rechargeable battery were built in.

There are accordingly 2 possibilities for switching this rechargeable battery function on again:

either the lessor switches over the setting using his/her smartphone or tablet when the event lamps are returned to the lessor.

Alternatively, the lessor changes the operating state in the online database and the customer who has leased the lamps goes online using his/her own app on the mobile device and thus synchronizes the settings from the online database. As a result, what has then been stored in the operating software of the app is the fact that the rechargeable battery function of these spotlights has been activated again and this information can be transmitted to the event lamp, which accordingly behave as a battery-powered lamp again. Therefore, no additional hardware is required for this activation and deactivation of the rechargeable battery function via an app.

Designing a mobile electrical event lamp for leasing for events such that this can be used alternatively for permanently wired and also battery-powered operation also has a further relevant function with regard to switching off the rechargeable battery during wired operation:

If the event lamps are set up in a wired fashion for set-up at a trade fair and at the end of the trade fair day people leave the trade fair hall in the evening, the electrical power in the hall is generally switched off. All users of electrical power are switched off simultaneously, with just the battery-powered lamps not being switched off.

In the case of previous battery-powered event lamps, it is therefore necessary to take this into consideration and to switch off the lamps separately; in the event of any omission, somebody has to return to switch off the lamps. This means additional effort and moreover the rechargeable battery of the event lamp is used up unnecessarily.

In the operating mode of an event lamp without a rechargeable battery, however, the lamps indeed precisely do not behave like battery-powered lamps: as soon as the electrical power is switched off, they likewise switch off immediately. Once the electrical power returns, they switch on again and are in the last operating state.

If this function of the deactivation of battery-powered operation were not incorporated in the mobile electrical event lamp according to the invention for permanently wired and also battery-powered operation, these event lamps would instead run until the rechargeable batteries are drained, and would then shut down. After this shutdown, the next time that electrical power is supplied, the lamps would identify this as charging current and no longer switch on, as would actually be intended, when the electrical power to the trade fair hall is turned on again.

The invention claimed is:

1. An electrical mobile event lamp comprising:
    an electronic controller, usable in lighting concepts for events,
    a built-in rechargeable battery for supplying power to the electrical mobile event lamp, and
    a wiring for connecting the electrical mobile event lamp to an alternative power supply, wherein
    the electronic controller is configured to perform a blocking function for an access to the built-in rechargeable battery,
    the electronic controller is configured to activate or deactivate the blocking function via a data connection by an external device,
    the electrical mobile event lamp is configured to operate under a battery-powered operation mode where the power is supplied from the built-in rechargeable battery and a wired operation mode where the power is supplied via the wiring of the electrical mobile event lamp,
    the electronic controller is configured to switch from the battery-powered operation mode to the wired operation mode by activating the blocking function for the access to the built-in rechargeable battery, and
    the activation or deactivation of the blocking function for the access to the built-in rechargeable battery in the electrical mobile event lamp is effected in response to a manual input of an activation code or a deactivation code.

2. The electrical mobile event lamp as claimed in claim 1, wherein
    there is an interface for intervention in relation to the electronic controller of the electrical mobile event lamp by the external device for data processing, and
    the blocking function for the access to the built-in rechargeable battery is activatable or deactivatable in response to the manual input of the activation or the deactivation code by way of the interface of the external device for data processing.

3. The electrical mobile event lamp as claimed in claim 2, wherein
    a smartphone, a tablet, a mobile device, or a stationary device is provided as the external device for data processing, and
    the electronic controller is configured to communicate with the external device by way of wired or wireless data transmission or remote data transmission.

4. A method for the activation and deactivation of the blocking function for the access to the built-in rechargeable battery by the electrical mobile event lamp as claimed in claim 1, wherein
    said blocking function is activated or deactivated by a data input or data transmission into the electronic controller,
    the data input is effected directly at the electrical mobile event lamp or by way of the external device for data processing which is connected to the electrical mobile event lamp via an interface, and
    the data transmission is effected in a wired or wireless manner or as remote data transmission.

5. The method as claimed in claim 4, wherein
    the activation and deactivation of the blocking function for rechargeable battery operation is stored in a database on the external device for a specific electrical mobile event lamp,
    a presently authorized operating state of the specific electrical mobile event lamp is defined in said database,
    the activation or deactivation of the blocking function in the electronic controller of the electrical mobile event lamp is effected by way of accessing and reconciling the presently authorized operating state of the specific electrical mobile event lamp stored in the database, and
    by wired or wireless data transmission or remote data transmission, the electrical mobile event lamp directly accesses the presently authorized operating state stored for the specific electrical mobile event lamp in the database to cause the activation or deactivation of the blocking function for the access to the built-in rechargeable battery.

6. The method as claimed in claim 4, wherein
the activation and deactivation of the blocking function for rechargeable battery operation is stored in a database on the external device for a specific electrical mobile event lamp,
a presently authorized operating state of the specific electrical mobile event lamp is defined in said database,
the activation or deactivation of the blocking function in the electronic controller of the electrical mobile event lamp is effected by way of accessing and reconciling the presently authorized operating state of the specific electrical mobile event lamp stored in the database, and
wherein, by wired or wireless data transmission or remote data transmission, the external device for data processing connected to the electronic controller of the electrical mobile event lamp accesses the presently authorized operating state stored for the specific electrical mobile event lamp in the database and transmits said presently authorized operating state by the wired or wireless data transmission into the electronic controller of the electrical mobile event lamp to cause the activation or deactivation of the blocking function for the access to the built-in rechargeable battery.

7. An electrical mobile event lamp comprising:
an electronic controller, usable in lighting concepts for events,
a built-in rechargeable battery for supplying power to the electrical mobile event lamp, and
a wiring for connecting the electrical mobile event lamp to an alternative power supply,
wherein
the electronic controller is configured to perform a blocking function for an access to the built-in rechargeable battery,
the electronic controller is configured to activate or deactivate the blocking function via a data connection by an external device,
the electrical mobile event lamp is configured to operate under a battery-powered operation mode where the power is supplied from the built-in rechargeable battery and a wired operation mode where the power is supplied via the wiring of the electrical mobile event lamp,
the electronic controller is configured to switch from the battery-powered operation mode to the wired operation mode by activating the blocking function for the access to the built-in rechargeable battery,
there is a database on the external device at least for the activation or deactivation of the blocking function in the electrical mobile event lamp,
a presently authorized operating state of a specific electrical mobile event lamp is defined in the database, and
the activation or deactivation of the blocking function in the electronic controller of the electrical mobile event lamp is effected by way of accessing and reconciling the presently authorized operating state of the specific electrical mobile event lamp stored in the database.

8. The electrical mobile event lamp as claimed in claim 7, wherein
the electrical mobile event lamp has technical components for wired or wireless data transmission or remote data transmission, and
the technical components are configured to directly access the presently authorized operating state stored for the specific electrical mobile event lamp in the database to cause the activation or deactivation of the blocking function for the access to the built-in rechargeable battery.

9. The electrical mobile event lamp as claimed in claim 7, wherein
the external device for data processing is configured to be connected to the electronic controller of the electrical mobile event lamp and has technical components for wired or wireless data transmission or remote data transmission, and
the external device is configured to access the presently authorized operating state stored for the specific electrical mobile event lamp in the database and transmit the presently authorized operating state to the electronic controller of the electrical mobile event lamp to cause the activation or deactivation of the blocking function for the access to the built-in rechargeable battery.

* * * * *